US011427219B2

(12) United States Patent
Olsson et al.

(10) Patent No.: US 11,427,219 B2
(45) Date of Patent: Aug. 30, 2022

(54) DRIVING ASSISTANCE METHOD AND SYSTEM

(71) Applicant: Zenuity AB, Gothenburg (SE)

(72) Inventors: Claes Olsson, Mölnlycke (SE); Per Lofter, Stora Höga (SE)

(73) Assignee: Zenuity AB, Gothenburg (SE)

( * ) Notice: Subject to any disclaimer, the term of this patent is extended or adjusted under 35 U.S.C. 154(b) by 98 days.

(21) Appl. No.: 16/857,602

(22) Filed: Apr. 24, 2020

(65) Prior Publication Data
US 2020/0339150 A1 Oct. 29, 2020

(30) Foreign Application Priority Data

Apr. 26, 2019 (EP) .................................... 19171433

(51) Int. Cl.
*B60W 60/00* (2020.01)
*B60W 10/18* (2012.01)
(Continued)

(52) U.S. Cl.
CPC .......... *B60W 60/001* (2020.02); *B60W 10/18* (2013.01); *B60W 10/20* (2013.01);
(Continued)

(58) Field of Classification Search
CPC .... B60W 60/001; B60W 10/18; B60W 10/20; B60W 30/12; B60W 40/08; B60W 50/14; B60W 2510/18; B60W 2510/202; B60W 2754/20; B60W 60/0053; B60W 60/0055; B60W 2540/215; B60W 2556/50; B60W 10/184; B60W 2710/182; B60W 2710/202; B60W 30/18145; B60W 30/18154; B60W 30/18163; B60W 50/085; B60W 50/08; B60W 40/00; B60W 60/00; G01C 21/3407; G01C 21/3691; G05D 1/0212
See application file for complete search history.

(56) References Cited

U.S. PATENT DOCUMENTS

| 2014/0172226 A1* | 6/2014 | Goerick | .................... B60T 7/22 701/28 |
| 2017/0361853 A1 | 12/2017 | Nagy et al. | |
| 2018/0024564 A1* | 1/2018 | Matsuda | ......... B60W 30/18145 701/25 |

FOREIGN PATENT DOCUMENTS

DE 102016212055 A1 1/2018

OTHER PUBLICATIONS

Extended European Search Report dated Nov. 11, 2019 for European Patent Application No. 19171433.6., 7 pages.

* cited by examiner

Primary Examiner — Alan D Hutchinson
(74) Attorney, Agent, or Firm — Sage Patent Group

(57) ABSTRACT

A method for controlling vehicle system of a vehicle is disclosed. The method comprises determining an expected path of the vehicle, determining a vehicle trajectory for the determined expected path, and determining at least one required control parameter value of a driver assistance system based on the determined vehicle trajectory. Further, the method comprises comparing the at least one required control parameter value to a predefined threshold scheme associated with the driver assistance system, and sending a signal to a Human Machine Interface, HMI, of the vehicle based on the comparison. Then, the method comprises receiving a feedback signal originating from a user of the vehicle, and controlling the driver assistance system based on the comparison and the received feedback signal.

14 Claims, 2 Drawing Sheets

(51) Int. Cl.
*B60W 10/20* (2006.01)
*B60W 30/12* (2020.01)
*B60W 40/08* (2012.01)
*B60W 50/14* (2020.01)
*G01C 21/34* (2006.01)
*G01C 21/36* (2006.01)
*G05D 1/02* (2020.01)

(52) U.S. Cl.
CPC ............ *B60W 30/12* (2013.01); *B60W 40/08* (2013.01); *B60W 50/14* (2013.01); *G01C 21/3407* (2013.01); *G01C 21/3691* (2013.01); *G05D 1/0212* (2013.01); *B60W 2510/18* (2013.01); *B60W 2510/202* (2013.01)

DRIVING ASSISTANCE METHOD AND SYSTEM

CROSS-REFERENCE TO RELATED APPLICATIONS

The present application for patent claims priority to European Patent Application Ser. No. 19171433.6, entitled "DRIVING ASSISTANCE METHOD AND SYSTEM" filed on Apr. 26, 2019, assigned to the assignee hereof, and expressly incorporated herein by reference.

TECHNICAL FIELD OF THE INVENTION

The present disclosure relates to the field of autonomous and semi-autonomous driving. In particular, the present disclosure relates to a co-operation based solution for driving assistance.

BACKGROUND

Today, many vehicles have a variety of driver support functions in the form of advanced driver assistance systems (ADAS). Also, many of these support function form a basis for current and future autonomous drive (AD) functions. Examples of ADAS features or functions include lane departure warning systems, lane centring, lane keeping aid, pilot assist, lane change assistance, parking sensors, pedestrian protection systems, blind spot monitors, adaptive cruise control (ACC), anti-lock braking systems, and so forth. These functions supplement the traditional driver control of the vehicle with one or more warnings or automated actions in response to certain scenarios.

The development of these features and functions are important factors not only in terms of increasing road safety, but also in terms of reducing the cognitive burden for vehicle users and improving the overall user experience.

It is envisioned that during autonomous driving, an occupant of the vehicle will be able to devote himself at least partially to other activities. However, still today there are no available autonomous solutions that are fully capable of performing autonomous driving in all scenarios, and at all road sections. Accordingly, at least for the time being, when an autonomous drive feature recognizes an upcoming road or traffic scenario where the feature will likely be unable to perform the autonomous driving to a full extent, the feature will then ask the occupant to take over control of the vehicle. The taking over of control of the vehicle is often referred to as a handover.

In more detail, when the autonomous drive feature goes outside of its operational scope the driver needs to take over or help the system. The autonomous driver feature may provide a notification to the driver, and the driver will need to disengage the feature or if the notification was not received, the driver may be surprised by a failing system.

There is therefore a need for a new and improved method and system for facilitating co-operation between autonomous drive features and the driver or occupant of the vehicle.

SUMMARY OF THE INVENTION

It is therefore an object of the present disclosure to provide a method for controlling vehicle systems of a vehicle, a non-transitory computer-readable storage medium, a vehicle control device, and a vehicle comprising such a control device, which alleviate all or at least some of the drawbacks of presently known solutions.

This object is achieved by means of a for controlling vehicle systems of a vehicle, a non-transitory computer-readable storage medium, a vehicle control device, and a vehicle comprising such a control device as defined in the appended claims. The term exemplary is in the present context to be understood as serving as an instance, example or illustration.

According to a first aspect of the present disclosure, there is provided a method for controlling vehicle systems of a vehicle. The method comprises determining an expected path of the vehicle, determining a vehicle trajectory for the determined expected path, and determining at least one required control parameter value of a driver assistance system based on the determined vehicle trajectory. Further, the method comprises comparing the at least one required control parameter value to a predefined threshold scheme associated with the driver assistance system, and sending a signal to a Human Machine Interface, HMI, of the vehicle based on the comparison. Then, the method comprises receiving a feedback signal originating from a user of the vehicle, and controlling the driver assistance system based on the comparison and the received feedback signal.

Hereby presenting a method for controlling a driver assistance feature of a vehicle in order to compensate for at least some of the shortcomings of presently known systems. In more detail, the proposed method aims to mitigate problems associated with the limitations (e.g. sensor capability, functional safety, algorithmic limitations, etc.) of some driver assistance systems in certain traffic scenarios so to increase the operational capability of such systems.

A vehicle trajectory is in the present context to be construed as a time dependent path. In other words, the step of determining a vehicle trajectory may be understood as determining a vehicle pose at every point in time for the vehicle for the execution of the path. In more detail, an expected path may be defined by a way to reach a desired destination from a current position of the vehicle. Thus, the trajectory is then used to define in more detail the operations that the vehicle needs to complete in order to execute the expected path and reach the desired destination.

A control parameter value is in the present context to be understood as a parameter for the driver assistance system is dependent upon to execute an operation/manoeuvre. For example, for a lane keeping assist system a control parameter value can be a minimum lateral distance to a road boundary. Other examples of control parameter values include a steering torque value, a minimum distance to an object/obstacle, a maximum acceleration, a maximum brake force, and so forth. Analogously, the predefined threshold scheme may comprise threshold values (e.g. factory settings) for the relevant control parameters.

In an illustrative example, the vehicle may be approaching a scenario where an autonomous drive feature is about to overtake a vehicle on a narrow road. However, in order to perform the operation the predefined threshold value for a minimum lateral distance to a road edge and an external obstacle (i.e. the external vehicle) must be overridden or temporarily reduced. Thus, the method includes sending a signal to a driver of the vehicle so that he/she can confirm the temporary change to the threshold value or to temporarily take over control of the vehicle.

The present inventor realized that supervised ADAS or AD features for steering and braking (i.e. "Traffic Assist") cannot handle all traffic situations that can occur on the roads where it is operational due to system limitations. Such limitations are related to sensor capabilities, functional safety (limiting the available steering torque), algorithmic limitations, etc. When the ADAS or AD feature go outside their operational scope, the driver needs to take over or help the system. In this case, it is up to driver to be aware of potential limitations, which can be inconvenient for the user or potentially dangerous. Thus, by improving the cooperation between the ADAS/AD feature and the driver of the vehicle, such problems can be mitigated. In more detail, the present inventor realized that by having the system asking for some additional driver attention in order to temporarily remove some system limitations, advantages in terms of user experience and overall road safety can be achieved.

In accordance with an exemplary embodiment of the present disclosure, the method further comprises receiving, from a localization system of the vehicle, a geographical location of the vehicle, and receiving map data comprising information about a road geometry of a surrounding environment of the vehicle. Accordingly, the step of determining the expected path of the vehicle is based on the received geographical location and the received map data.

Moreover, in accordance with another exemplary embodiment of the present disclosure, the method further comprises receiving, from a perception system of the vehicle, sensor data comprising information about a surrounding environment of the vehicle. Thus, the step of determining the trajectory of the vehicle is based on the received sensor data.

According to a second aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with a third aspect of the present disclosure, there is provided a vehicle control device for controlling vehicle systems of a vehicle. The vehicle control device comprises a control circuit configured to determine an expected path of the vehicle, and to determine a vehicle trajectory for the determined expected path. The control circuit is further configured to determine at least one required control parameter value of a driver assistance system based on the determined vehicle trajectory, and to compare the at least one required control parameter value to a predefined threshold scheme associated with the driver assistance system. Then, the control circuit is configured to send a signal to a Human Machine Interface (HMI) of the vehicle, to receive a feedback signal originating from a user of the vehicle, and to control the driver assistance system based on the comparison and the received feedback signal. With this aspect of the disclosure, similar advantages and preferred features are present as in the previously discussed first aspect of the disclosure.

Still further, in accordance with a fourth aspect of the present disclosure, there is provided a vehicle comprising a localization system for determining a geographical location of the vehicle, a perception system for retrieving information about the surrounding environment of the vehicle, and a vehicle control device according to any one of the embodiments disclosed herein.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
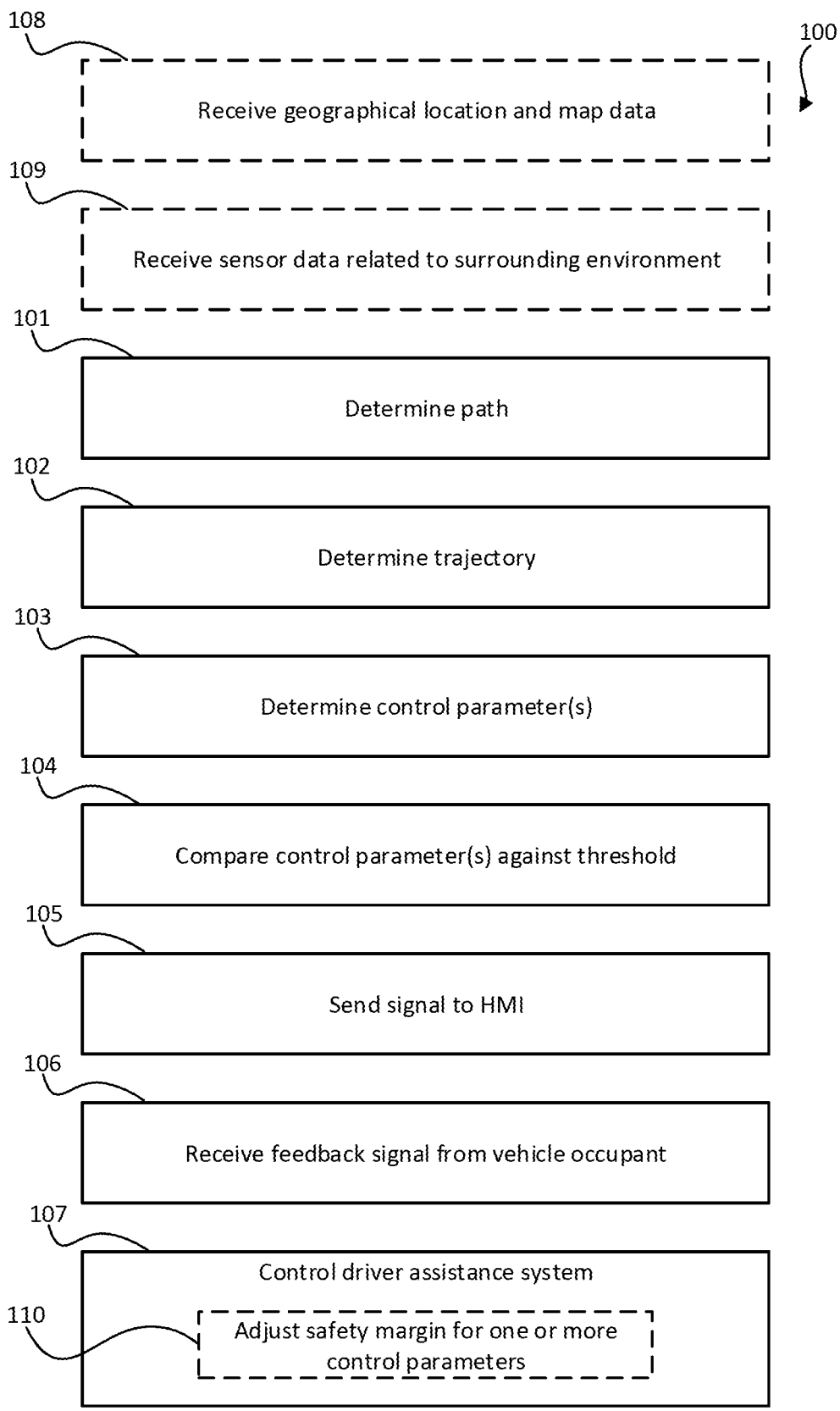
FIG. 1 is a schematic flow chart representation of a method for controlling vehicle system of a vehicle in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates a flow chart representation of a method 100 for controlling one or more vehicle system of a vehicle. The method comprises determining 101 an expected path of the vehicle. The path may for example be retrieved from a navigation system where a vehicle occupant or driver has provided a desired destination and a path to the destination has been generated by the navigation system. Next, a vehicle trajectory is determined 102 for the determined expected path. A vehicle trajectory is in the present context to be construed as a time dependent path. In other words, the step of determining 102 a vehicle trajectory may be understood as determining a vehicle pose at every point in time for the vehicle for the execution of the path.

Further, the method comprises determining 103 at least one required control parameter value of a driver system based on the determined 102 vehicle trajectory. The control parameter value may for example be a required steering torque value, a required acceleration, a required longitudinal a distance to object, a required lateral distance to object, a required lateral distance to road edge, a required brake force value, etc. Next, the at least one required control parameter value is compared 104 against a predefined threshold scheme associated with the driver assistance system. In more detail, the driver assistance system (e.g. auto pilot feature) may be associated with a number of predefined threshold values for various control parameters based on passenger comfort, safety margins, etc. For example, the predefined threshold scheme for an auto pilot feature may comprise a maximum threshold distance to a traced road edge (safety margin) and/or a maximum allowable acceleration (passenger comfort).

The method 100 further comprises sending 105 a signal to a Human Machine Interface (HMI) of the vehicle based on the comparison 104. The (in-vehicle) HMI may for example be the instrument cluster (behind the steering wheel), the centre console (i.e. the control-bearing surfaces in the centre area of the vehicle interior front beginning in the dashboard and continuing beneath it), vibration actuators in the steering wheel, the loudspeakers of the infotainment system, a heads-up display, and so forth. In more detail, the step of sending 105 sending a signal may be construed as notifying a driver of the vehicle by e.g. displaying a message on a screen, causing the steering the wheel to vibrate, outputting a sound through the loudspeakers, or similar.

In more detail, the step of sending 105 a signal to the HMI, may comprise sending a request to (temporarily) adjust a threshold value in the predefined threshold scheme for one or more parameters based on the comparison. In other words, the sent 105 signal may be indicative of a request to temporarily adjust one or more threshold values in the predefined threshold scheme. For example, the vehicle may conclude that it cannot complete the determined vehicle trajectory based on the currently set threshold values for one or more control parameters. Thus, in order to complete the determined vehicle trajectory, the vehicle must adjust a threshold (e.g. reduce the safety margin to a traced road edge in order to complete an overtaking). Thus, a request is sent to a driver of the vehicle, the driver can then confirm or deny the (temporary) adjustment of the threshold value(s). Alternatively, the message may include a request for a handover, i.e. a request for the driver to (at least temporarily) take over control of the vehicle in order to complete an operation that is outside of the operating range of the driver assistance system.

Thus, the method 100 further comprises receiving 106 a feedback signal originating from a user of the vehicle. The feedback signal can be understood as a response to the previously sent 105 signal. Going along with the above examples, the user/driver may then allow the system to temporarily reduce one or more safety margins in order to complete an operation required to finish the determined 102 vehicle trajectory. Stated differently, the received 106 feedback signal may be indicative of a confirmation of a temporary adjustment of the one or more threshold values in the predefined threshold scheme. Then, based on the comparison 104 and the received 106 feedback signal, the driver assistance system is controlled 107. For example, if the comparison 104 indicated that one or more threshold values of the predefined threshold scheme must be reduced (by e.g. 15%) and the received 106 feedback signal indicated that this was an allowable adjustment, the method 100 comprises adjusting 110 the one or more safety margins accordingly. In some embodiments, the controlling 107 of the driver assistance system comprises temporarily adjusting 110 the one or more threshold values in the threshold scheme in order to complete an operation required to finish the determined vehicle trajectory.

Accordingly, one or more threshold values may be temporarily adjusted when the vehicle approaches a situation or scenario where it cannot complete the driving task (trajectory) by means of vehicle-driver-cooperation. Thus, once the driving task is completed, the one or more previously adjusted 110 threshold values may be set to their original values automatically without further input from the driver. Thereby, the driver is not constantly bombarded with messages via the in-vehicle HMI which improves the overall user experience. This is in contrast to forcing the driver to switch between one or more driving modes (with differing safety margins/thresholds) depending on upcoming scenarios or situations which draws focus from the driver and reduces the overall user experience.

The feedback signal can be in the form of a tactile feedback (e.g. the driver pushing a button), an audio feedback (e.g. voice command), or driver monitoring system (DMS) feedback (e.g. verifying that the driver is paying attention to the road and use this as a silent confirmation). Accordingly, the vehicle preferably has a DMS in communicative connection with at least one camera arranged to capture images of the driver. The DMS can then be used to determine a driver state (attentive or distracted) by for example determining a gaze direction, blink frequency, eye opening size, etc. of the driver. The DMS feedback may for example be used for "automatic take off" at intersections, where the autonomous drive feature first performs a check to verify that the driver is paying attention to the road before accelerating forward through the intersection.

Further, the method 100 may comprise receiving 108, from a localization system of the vehicle, a geographical location of the vehicle. The localization system may for example be a Global Navigation Satellite System (GNSS) such as e.g. a GPS, GLONASS, BEIDOU, GALILEO, or any other equivalent system. The geographical location may for example be defined by a set of geographical coordinates. The method 100 may also comprise receiving 108 map data comprising information about a road geometry of a surrounding environment data. The map data may for example be in the form of HD map data retrieved from a remote server (i.e. the cloud) or from a local data repository (e.g. a memory unit of the vehicle comprising a stored map of a geographical area). Thus, the step of determining 101 the expected path of the vehicle can be based on the received 108 geographical location and map data.

Moreover, the method 100 may comprise receiving 109, from a perception system of the vehicle, sensor data comprising information about a surrounding environment of the vehicle. Accordingly, step of determining 101 the expected path of the vehicle can be further based on the received sensor data. In more detail, the sensor data can be used to for example determine a position of any objects or obstacles (e.g. other vehicles) in the surrounding environment, lane positions, road edge tracing, and so forth in order to determine 101 the expected path of the vehicle in greater detail. The sensor data is advantageously used in order to determine 103 the required control parameters (e.g. distance between a vehicle that needs to be overtaken and the road edge) in order to complete the determined 102 trajectory.

In accordance with an exemplary embodiment of the present invention, the driver assistance system may be a lane support system (e.g. lane keeping assist) and the at least one control parameter comprises a (lateral) safety distance to a traced road boundary. Thus, the step of controlling 107 the driver assistance system comprises lowering a minimum road boundary distance threshold based on the comparison 104 and the received 106 feedback signal.

Alternatively, or additionally, the driver assistance system is a self-driving system or feature (i.e. autonomous driving function), and the at least one control parameter comprises a steering torque value. In more detail, the determined 102 trajectory may include a sharp curve, which requires a relatively high steering torque to be applied to the wheels of the vehicle. Thus, the step of controlling 107 the driver assistance system comprises controlling the steering torque value based on the received feedback signal. In more detail, the controlling of the steering torque value can be in the form of adjusting a maximum steering torque threshold (as defined by the predefined threshold scheme), or in other words, increasing the maximum available steering torque in order to complete the operation. Alternatively, the controlling of the steering torque can be in the form of adjusting the override logic if for example the driver of the vehicle is prompted to provide a steering assistance.

In yet another exemplary embodiment, the driver assistance system is a brake assist system, and the at least one control parameter is a brake force value. The step of controlling 107 the driver assistance system accordingly comprises controlling a brake force based on the received feedback signal. In an example scenario, the vehicle may be approaching a stationary object (e.g. stationary vehicle), and the signal that was sent 105 to the HMI, may notify the driver that the vehicle will brake in order to avoid a collision whereupon the driver can confirm or deny the operation, or alternatively override the control by actuating the brake pedal. By applying this feedback chain to a brake assist system, the risk of braking for false objects (false positives) can be reduced. Moreover, the method 100 may comprise (not shown) only sending 105 the signal to the HMI if there is an uncertainty about the need to brake, e.g. if sensor data is inconclusive.

Figure 2:
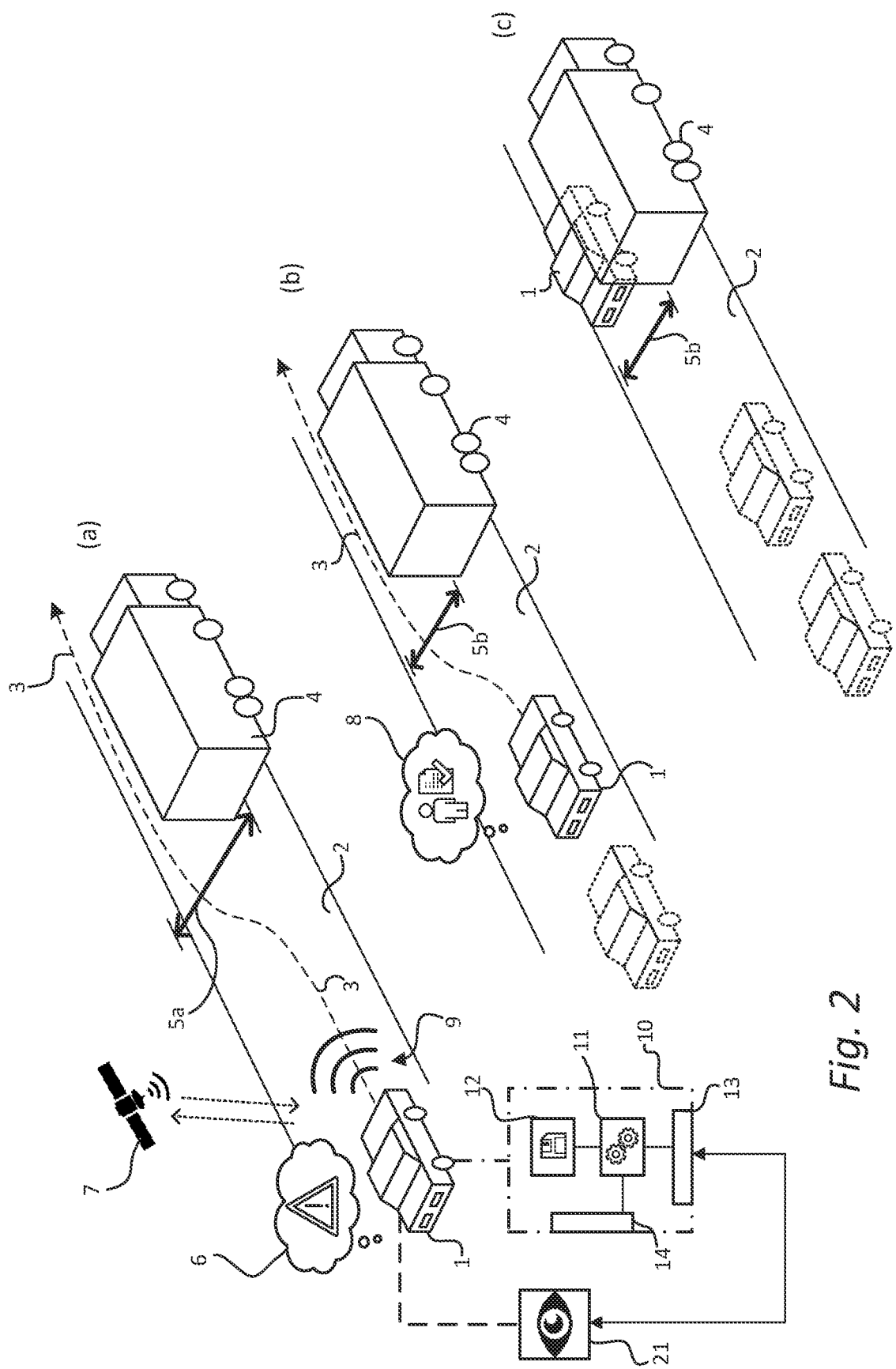
FIG. 2 is a schematic perspective view illustration of a vehicle comprising a vehicle control device for controlling vehicle system of the vehicle in accordance with an embodiment of the present disclosure.

FIG. 2 is a schematic perspective view of a vehicle 1 comprising a vehicle control device 10 for controlling vehicle system of the vehicle 1. In more detail, FIG. 2 shows a series of drawings (a), (b), and (c) that illustrate a vehicle-driver cooperation before overtaking an obstacle, here in the form of a truck 4, on a narrow road 2. The vehicle 1 has a vehicle control device 10 comprising a processor (may also be referred to as a control unit, controller, or control circuit) 11 and a memory 12 connected to the processor. The control unit 10 further has a set of interfaces 13, 14 for communicating with external entities (e.g. localization systems, perception systems 21, etc), namely a sensor interface 13 and a communication interface 14. The control circuit 11 is configured to execute instructions stored in the memory to perform a method according to any one of the embodiments disclosed herein.

Starting from the top-most drawing (i.e. drawing (a)), the vehicle control device 10 comprises a control circuit 11 configured to determine an expected path of the vehicle 1. In the illustrated example the path is merely to move forward along the illustrated road segment 2. Further, the control circuit 11 is configured to determine a vehicle trajectory 3 for the expected path. As previously disclosed, the expected path may for example be received from a navigation system of the vehicle 1. More specifically, the control circuit 11 can be configured to receive, from a localization system (e.g. GNSS) of the vehicle 1, a geographical location of the vehicle, and to receive map data from e.g. a remote or local data repository. A GNSS is in the present context to be understood as a system that uses satellites 7 to provide autonomous geo-spatial positioning. Thus, the control circuit 11 may accordingly be configured to determine the expect path of the vehicle based on the received geographical location and the received map data.

Moreover, the vehicle 1 is preferably equipped with a perception system 21. The perception system 21 is in the present context to be understood as a system having one or more sensors (e.g. cameras, RADARs, LIDARs, ultrasonic sensors) capable of collecting data representative of a surrounding environment of the vehicle. The control circuit 11 can accordingly be configured to receive sensor data from the perception system 21, where the sensor data comprises information about a surrounding environment of the vehicle 1. Thereby the control circuit 11 can use the sensor data to determine the vehicle trajectory 3. In more detail, the sensor data can advantageously be used to determine whether or not the vehicle 1 has to manoeuvre around one or more objects/obstacles 4 in order to be able to travel along the expected path.

Still further, once the trajectory is determined, the control circuit 11 is further configured to determine at least one required control parameter value 5b of a driver assistance system based on the determined vehicle trajectory. Then, the control circuit 11 is configured to compare the at least one required control parameter value 5b to a predefined threshold scheme associated with the driver assistance system. In the illustrated example, the driver assistance system can be interpreted as an autonomous drive feature or a lane keep assist system having a minimum allowable lateral distance to external objects and road edges. As illustrated in the top most drawing (a), the predefined threshold value (i.e. factory setting) 5a exceeds that of the available space between the road edge and the truck 4. The required control parameter value 5b is illustrated in the middle drawing (b), i.e. the required minimum lateral distance to the road edge and external obstacle 4 to complete the operation of overtaking the truck 4. Since the required control parameter 5b deviates from the predefined control parameter 5b as defined by the predefined threshold scheme, the control circuit 11 is configured to send a signal to a HMI of the vehicle 1.

The signal may comprise a message to a driver or occupant of the vehicle 1 informing about the situation and that the lateral safety margins need to be reduced in order to complete the operation. Alternatively, the sent signal may comprise information that the driver needs to take over control of the vehicle 1 in order to complete the operation. The control circuit 11 is further configured to receive a feedback signal 8 originating from a user (e.g. driver) of the vehicle 1. The feedback signal can be in the form of a confirmation that the lateral safety margins can be temporarily reduced, or that the driver takes over control in order to complete the operation (i.e. the takeover). Finally, the control circuit is configured to control the driver assistance system (e.g. reduce the safety margins) based on the comparison and the received feedback signal 8.

FIG. 2 is only one exemplary illustration of a scenario where the proposed solution is applicable. Another scenario where the proposed solution can be utilized is when the vehicle 1 is in autonomous drive and approaching one or more sharp curves and the control device 10 realizes that the operation cannot be completed without adjusting a maximum steering torque value.

Further, the vehicle 1 may be connected to external network(s) via for instance a wireless link (e.g. for retrieving map data). The same or some other wireless link may be used to communicate with other vehicles 4 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry in the vehicle. The communication/antenna interface 14 may further provide the possibility to send output to a remote location (e.g. remote operator or control centre) by means of the antenna 5. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for controlling vehicle systems of a vehicle, the method comprising:
   determining an expected path of the vehicle;
   determining a vehicle trajectory for the determined expected path;
   determining at least one required control parameter value of a driver assistance system based on the determined vehicle trajectory;
   comparing the at least one required control parameter value to a predefined threshold scheme associated with the driver assistance system;
   sending a signal to a Human Machine Interface (HMI) of the vehicle based on the comparison, wherein the sent signal comprises a request to temporarily adjust a threshold value in the predefined threshold scheme;
   receiving a feedback signal originating from a user of the vehicle, wherein the feedback signal comprises a confirmation of a temporary adjustment of the threshold value; and
   controlling the driver assistance system based on the comparison and the received feedback signal, by temporarily adjusting the threshold values in order to complete an operation required to finish the determined vehicle trajectory.

2. The method according to claim 1, further comprising:
receiving, from a localization system of the vehicle, a geographical location of the vehicle; and
receiving map data comprising information about a road geometry of a surrounding environment of the vehicle;
wherein the step of determining the expected path of the vehicle is based on the received geographical location and the received map data.

3. The method according to claim 1, further comprising:
receiving, from a perception system of the vehicle, sensor data comprising information about a surrounding environment of the vehicle;
wherein the step of determining the trajectory of the vehicle is based on the received sensor data.

4. The method according to claim 1, wherein the step of controlling the driver assistance system comprises controlling a safety margin for at least one control parameter.

5. The method according to claim 4, wherein the driver assistance system is a lane support system, and the at least one control parameter comprises a safety distance to a traced road boundary, wherein the step of controlling the driver assistance system comprises lowering a minimum road boundary distance threshold based on the comparison and the received feedback signal.

6. The method according to claim 4, wherein the driver assistance system is a self-driving system, and the at least one control parameter comprises a steering torque value, wherein the step of controlling the driver assistance system comprises controlling the steering torque value based on the received feedback signal.

7. The method according to claim 4, wherein the driver assistance system is a brake-assist system, and the at least one control parameter is a brake force value, wherein the step of controlling the driver assistance system comprises controlling a brake force based on the received feedback signal.

8. The method according to claim 1, wherein the feedback signal comprises at least one of a tactile feedback, audio feedback, and driver monitoring system (DMS) feedback.

9. A non-transitory computer-readable storage medium storing one or more programs configured to be executed by one or more processors of a vehicle control system, the one or more programs comprising instructions for performing the method, the method comprising:
determining an expected path of the vehicle;
determining a vehicle trajectory for the determined expected path;
determining at least one required control parameter value of a driver assistance system based on the determined vehicle trajectory;
comparing the at least one required control parameter value to a predefined threshold scheme associated with the driver assistance system;
sending a signal to a Human Machine Interface (HMI) of the vehicle based on the comparison, wherein the sent signal comprises a request to temporarily adjust a threshold value in the predefined threshold scheme;
receiving a feedback signal originating from a user of the vehicle, wherein the feedback signal comprises a confirmation of a temporary adjustment of the threshold value; and
controlling the driver assistance system based on the comparison and the received feedback signal, by temporarily adjusting the threshold values in order to complete an operation required to finish the determined vehicle trajectory.

10. A vehicle control device for controlling vehicle systems of a vehicle, the vehicle control device comprising a control circuit configured to:
determine an expected path of the vehicle;
determine a vehicle trajectory for the determined expected path;
determine at least one required control parameter value of a driver assistance system based on the determined vehicle trajectory;
compare the at least one required control parameter value to a predefined threshold scheme associated with the driver assistance system;
send a signal to a Human Machine Interface (HMI) of the vehicle, wherein the sent signal comprises a request to temporarily adjust a threshold value in the predefined threshold scheme;
receive a feedback signal originating from a user of the vehicle, wherein the feedback signal comprises a confirmation of a temporary adjustment of the threshold value; and
control the driver assistance system based on the comparison and the received feedback signal, by temporarily adjusting the threshold values in order to complete an operation required to finish the determined vehicle trajectory.

11. The vehicle control device according to claim 10, wherein the control circuit is further configured to:
receive, from a localization system of the vehicle, a geographical location of the vehicle; and
receive map data comprising information about a road geometry of a surrounding environment of the vehicle;
wherein the control circuit is configured to determine the expected path of the vehicle based on the received geographical location and the received map data.

12. The vehicle control device according to claim 10, wherein the control circuit is further configured to:
receive, from a perception system of the vehicle, sensor data comprising information about a surrounding environment of the vehicle;
wherein the control circuit is configured to determine the trajectory of the vehicle based on the received sensor data.

13. The vehicle control device according to claim 10, wherein the control circuit is further configured to:
control a safety margin for at least one control parameter of the driver assistance system based on the comparison and the received feedback signal.

14. A vehicle comprising:
a localization system for determining a geographical location of the vehicle;
a perception system for retrieving information about the surrounding environment of the vehicle; and
a vehicle control device for controlling vehicle systems of the vehicle, the vehicle control device comprising a control circuit configured to:
determine an expected path of the vehicle;
determine a vehicle trajectory for the determined expected path;
determine at least one required control parameter value of a driver assistance system based on the determined vehicle trajectory;
compare the at least one required control parameter value to a predefined threshold scheme associated with the driver assistance system;

send a signal to a Human Machine Interface (HMI) of the vehicle, wherein the sent signal comprises a request to temporarily adjust a threshold value in the predefined threshold scheme;
receive a feedback signal originating from a user of the vehicle, wherein the feedback signal comprises a confirmation of a temporary adjustment of the threshold value; and
control the driver assistance system based on the comparison and the received feedback signal, by temporarily adjusting the threshold values in order to complete an operation required to finish the determined vehicle trajectory.

* * * * *